United States Patent Office 3,538,164
Patented Nov. 3, 1970

3,538,164
SYNTHESIS OF DIHYDROCARVONE
John C. Leffingwell, Winston-Salem, N.C., assignor to R. J. Reynolds Tobacco Company, Winston-Salem, N.C., a corporation of New Jersey
No Drawing. Filed Feb. 8, 1968, Ser. No. 703,873
Int. Cl. C07c 49/30
U.S. Cl. 260—587                     2 Claims

ABSTRACT OF THE DISCLOSURE

Dihydrocarvone is obtained from limonene-1,2-epoxide by treatment thereof with small amounts of perchloric acid.

This invention relates to the synthesis of dihydrocarvone. Dihydrocarvone is an essential oil which occurs naturally in caraway seed oil and in natural spearmint flavors. While dihydrocarvone is useful in flavors and perfumes, synthetic dihydrocarvone has found only limited use in the flavoring and perfume industries because of its high cost. Dihydrocarvone has been obtained from limonene 1,2-epoxides by several prior art procedures but the yield of the desired product has been consistently low such as not more than about 30% of theory.

It has now been found that dihydrocarvone can be obtained in high yields of from 60 to 80% or more of theory by treating limonene-1,2-epoxides in an inert solvent with a small amount of perchloric acid. Thus, in accordance with the present invention limonene-1,2-epoxide is agitated in an inert solvent solution with about 0.05 to 2.0% by weight (based on limonene-1,2-epoxide) of perchloric acid. The temperature can vary and generally a temperature in the range of 0 to 75° C. is employed and preferably a temperature of from 15 to 40° C. Inert solvents such as carbon tetrachloride, chloroform, methylene chloride, pentane, hexane, cyclohexane, heptane, benzene, toluene, xylene, dioxane, tetrahydrofuran and the like can be employed. The period required for obtaining high yields of dihydrocarvone varies depending upon such factors as temperature and solvent employed; in general good yields of dihydrocarvone are obtained in reaction periods of from about 2 to 100 hours. The dihydrocarvone is recovered by neutralizing the perchloric acid and removing the solvent. The dihydrocarvone so produced can be further purified if necessary or desired by distilling the crude dihydrocarvone under reduced pressure.

As is known, limonene-1,2-epoxides can be obtained in high yield (circa 90%) by epoxidation of limonene with organic peracids such as peracetic, perpropionic and the like. The limonene-1,2-epoxide so produced generally comprises a mixture of cis and trans-limonene-1,2-epoxides in substantially equal ratio. A mixture of cis and trans-limonene-1,2-epoxides can be used in accordance with the present invention. Dihydrocarvone itself exists in two isomeric forms, that is, cis and trans dihydrocarvone, both of which are useful in flavors and perfumes. Optically active products are obtained; (+)-limonene-1,2-epoxides give (+)-dihydrocarbones and (−)-limonene-1,2-epoxides give (−)-dihydrocarvones while racemic limonene-1,2-epoxides give (±)-dihydrocarvones.

The following examples are illustrative of the present invention. In these examples the limonene-1,2-epoxide starting material was obtained in known manner from (+)-limonene ($\alpha_D$+98°) by peracetic acid epoxidation and consisted essentially of a 1:1 mixture of cis and trans-limonene epoxides. All temperatures are in degrees centigrade.

EXAMPLE 1

The limonene-1,2-epoxides (50.0 grams) were slowly dropped into a solution of 5 drops (~0.25 milliliter) 70% perchloric acid in 200 milliliters benzene at about 15° C. over a 2-hour period. The reaction was then slowly allowed to come to room temperature and stirred for 72 hours. During the course of the reaction the sample appreciably darkened. The crude reaction mixture was washed with a sodium bicarbonate solution and salt water, then dried over magnesium sulfate. The sample was stripped of solvent and analyzed by vapor phase chromatography over a 10 foot column of 10% diethyleneglycolsuccinate. Analysis indicated the sample to be primarily a mixture of the two isomeric dihydrocarvones. The sample was distilled over a 4-inch Vigreaux column to give 39 grams of material, boiling point 100–116°/15 millimeters of mercury, which was a mixture of the isomeric cis and trans dihydrocarvones (yield=78%). Product identification was made by comparing with a known sample by means of vapor phase chromatography and infrared spectra.

EXAMPLE 2

The (+)-limonene-1,2-epoxides (75 grams) were dropped into a solution of 15 microdrops (approximately 0.2 milliliter) 70% perchloric acid in 350 milliliters methylene chloride over 45 minutes. The agitating solution was held at 25–28° by means of an external cooling (water-ice) bath. After addition was complete the reaction was stirred for 2 hours. Vapor phase chromatographic analysis at the end of 1 hour indicated that about 70% conversion of the epoxides to the dihydrocarvones had occurred; at the end of 2 hours over 95% conversion was observed. A slight darkening of the solution was noted toward the end of the reaction period. The reaction mixture was worked up in a manner similar to Example 1 to give 78 grams of crude product which analyzed by vapor phase chromatography as ~5% methylene chloride, ~4% limonene (present in starting epoxides), trace limonene epoxides, ~6% four unknown components and ~83–85% dihydrocarvones. The crude sample was distilled under reduced pressure to give 60.1 grams material, boiling point 63–68°/1 millimeter of mercury, $\alpha_D^{23}$+18.6° (neat), $n_D^{23}$ 1.4698, which was identified as essentially pure dihydrocarvones (yield=~80%). Minor contaminants were identified as limonene and carvenone. A higher boiling fraction (5.4 grams) boiling point 68–71°/0.5–1.0 millimeter of mercury, was also obtained which analyzed as an approximately 1:1 mixture of dihydrocarvone and carvenone.

EXAMPLE 3

The (+)-limonene-1,2-epoxides (75.0 grams) were reacted as in Example 2 with 15 microdrops of 70% perchloric acid in 400 milliliters of chloroform. Reaction was complete in 4.5 hours to yield, after work up, 76.6 grams of crude dihydrocarvones. Distillation under reduced pressure gave 49.5 grams (66%) dihydrocarvones, boiling point 63–68°/1.5 millimeters of mercury, $\alpha_D$+16.9°, $n_D^{23}$ 1.4696. Higher boiling fractions (approximately 10 grams) contained appreciable amounts of carvenone.

EXAMPLE 4

The (+)-limonene-1,2-epoxides (75.0 grams) were reacted as in Example 2 with 15 microdrops of 70% perchloric acid in 350 milliliters hexane. The reaction mixture was agitated at room temperature and analyzed periodically by vapor phase chromatography. The reaction was only about ⅔ complete at the end of 24 hours; reaction was complete at the end of 48 hours. Work-up in the usual manner afforded 77.3 grams of crude dihydrocarvones. Distillation afforded 45.3 grams (60%) dihydrocarvones, boiling point 73–75°/2.0 millimeters of mercury, $\alpha_D + 16.5°$, $n_D^{23}$ 1.4695.

Dihydrocarvone is a sensitive molecule and is known to undergo facile isomerization to carvenone. This isomerization can be depicted by the following:

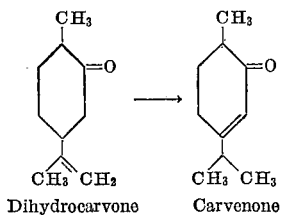

Dihydrocarvone → Carvenone

Because of this facility for isomerization, care should be exercised in purifying the crude dihydrocarvone produced by the process of the present invention. The perchloric acid should be neutralized before solvent removal and distillation of the crude dihydrocarvone after solvent removal, if carried out, should be conducted under reduced pressure, that is, a low vacuum from about 0.05 to 15 millimeters of mercury and a temperature of 34 to 116° C.

The advantages of the present invention are apparent from the foregoing. It is apparent that the invention provides an efficient method for the production of dihydrocarvone in exceptionally good yields from limonene-1,2-epoxide.

Those modifications and equivalents which fall within the spirit of the invention and the scope of the appended claims are to be considered part of the invention.

I claim:

1. A process for producing dihydrocarvone which comprises contacting at a temperature of from about 0 to 75° C. limonene-1,2-epoxide in an inert reaction solvent with from about 0.05 to 2% by weight of perchloric acid based on limonene-1,2-epoxide, neutralizing the perchloric acid and recovering dihydrocarvone.

2. A process in accordance with claim 1 wherein treatment of the limonene-1,2-epoxide is carried out at a temperature from 15 to 40° C.

References Cited

Royals et al., I. Jour. of Org. Chem., 31 (1966) 1937–44.

Royals et al. II, Jour. Am. Chem. Soc., 77 (1955) 3405–8.

Settine et al., Jour. of Org. Chem., 29 (1964) 616–8.

LEON ZITVER, Primary Examiner

N. P. MORGENSTERN, Assistant Examiner